(12) United States Patent
Kitazoe et al.

(10) Patent No.: US 9,338,695 B2
(45) Date of Patent: May 10, 2016

(54) SIGNALING OF SUPPORTED CARRIER BANDWIDTHS FOR CARRIER AGGREGATION

(71) Applicant: QUALCOMM Incorporated, San Diego, CA (US)

(72) Inventors: Masato Kitazoe, Tokyo (JP); Tingfang Ji, San Diego, CA (US); Peter Gaal, San Diego, CA (US); Gene Fong, San Diego, CA (US); Lorenzo Casaccia, Rome (IT); Oronzo Flore, Ostuni (IT)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 13/687,818

(22) Filed: Nov. 28, 2012

(65) Prior Publication Data

US 2013/0142139 A1    Jun. 6, 2013

Related U.S. Application Data (60) Provisional application No. 61/565,978, filed on Dec. 1, 2011.

(51) Int. Cl.
*H04W 28/20* (2009.01)
*H04L 5/00* (2006.01)

(52) U.S. Cl.
CPC .............. *H04W 28/20* (2013.01); *H04L 5/001* (2013.01); *H04L 5/0037* (2013.01); *H04L 5/0064* (2013.01); *H04L 5/0092* (2013.01); *H04L 5/0098* (2013.01)

(58) Field of Classification Search
CPC ..... H04W 28/20; H04L 5/001; H04L 5/0098; H04L 5/0064; H04L 5/0092; H04L 5/0037; H04L 5/0091

USPC ........................................ 370/328, 329, 341
See application file for complete search history.

(56) References Cited

U.S. PATENT DOCUMENTS

2011/0039593 A1    2/2011  Lee et al.
2011/0205995 A1*   8/2011  Grovlen ................. 370/329
(Continued)

FOREIGN PATENT DOCUMENTS

EP           2427028 A1       3/2012
EP           2624649 A1  *    8/2013
WO     WO-2010125769 A1      11/2010

OTHER PUBLICATIONS

Ericsson, "Channel bandwidth combinations for CA band combinations", Nov. 14-18, 2011 TSG-RAN Working Group 4 (Radio) meeting #61, R4-115681, pp. 1-13.*

(Continued)

*Primary Examiner* — Paul H Masur
*Assistant Examiner* — Kabir Jahangir
(74) *Attorney, Agent, or Firm* — Holland & Hart LLP (57) ABSTRACT

Techniques for signaling carrier bandwidths supported by a user equipment (UE) for carrier aggregation are disclosed. A UE may be configured with a plurality of carriers for carrier aggregation. Each carrier may have one carrier bandwidth of a set of possible carrier bandwidths. The set of possible carrier bandwidths may be dependent on a band in which the carrier belongs. Multiple combinations of carrier bandwidths for the plurality of carriers may be possible. The UE may identify at least one supported carrier bandwidth combination for the plurality of carriers. Each of the supported carrier bandwidth combinations may include a particular carrier bandwidth for each configured carrier. The UE may send signaling indicative of the at least one supported carrier bandwidth combination. The UE may thereafter communicate on the plurality of carriers based on a carrier bandwidth combination selected from the supported carrier bandwidth combination(s).

21 Claims, 5 Drawing Sheets

(56) References Cited

U.S. PATENT DOCUMENTS

| | | |
|---|---|---|
| 2011/0243083 A1 | 10/2011 | Zhang et al. |
| 2011/0267978 A1* | 11/2011 | Etemad .......................... 370/254 |
| 2011/0268001 A1* | 11/2011 | Lee et al. ....................... 370/311 |
| 2011/0317647 A1 | 12/2011 | Cho et al. |
| 2012/0039293 A1* | 2/2012 | Feng ..................... H04L 5/0044 370/329 |
| 2012/0044910 A1* | 2/2012 | Maeda et al. ................. 370/332 |
| 2012/0083309 A1 | 4/2012 | Kwon et al. |
| 2012/0140746 A1 | 6/2012 | Zhu et al. |
| 2012/0183095 A1 | 7/2012 | Gholmieh et al. |

OTHER PUBLICATIONS

ISA/EPO, International Search Report and Written Opinion, Oct. 11, 2013, 17 pgs., Int'l Appl. No. PCT/US2012/067101, European Patent Office, Rijswijk, NL.

Nokia, TP for CA UE TR: Carrier Aggregation Rules, 3GPP Draft, TSG-RAN Working Group 4 (Radio) Ad Hoc Meeting #2, R4-101129, Dublin, Ireland, Apr. 12-16, 2010, 14 pgs.

ISA/EPO, Partial International Search Report dated Aug. 1, 2013, Int'l Pat. App. No. PCT/US2012/067101, 10 pgs.

Ericsson et al., "Channel Bandwidth Combinations for CA Band Combinations," Agenda 6.2.1, TSG-RAN Working Group 4 (Radio) Meeting #61, R4-115681, Nov. 14-18, 2011, San Francisco, CA, 4 pgs.

NTT DOCOMO et al., "WF on UE Category for Re. 10," Agenda Item 6.9, 3GPP TSG RAN WG1 Meeting #62, R1-105036, Aug. 23-27, 2010, Madrid, Spain, 2 pgs.

Taiwan Intellectual Property Office, Search Report (translation), Jul. 21, 2014, TW Appl. No. 101145133, 1 pg.

* cited by examiner

SIGNALING OF SUPPORTED CARRIER BANDWIDTHS FOR CARRIER AGGREGATION

The present application claims priority to provisional U.S. Application Ser. No. 61/565,978, entitled "SIGNALING OF SUPPORTED CARRIER BANDWIDTHS FOR CARRIER AGGREGATION," filed Dec. 1, 2011 and incorporated herein by reference in its entirety.

BACKGROUND

I. Field

The present disclosure relates generally to communication, and more specifically to techniques for supporting communication in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication with a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple carriers. A carrier may refer to a range of frequencies used for communication and may be associated with certain characteristics. For example, a carrier may be associated with system and/or control information describing operation on the carrier. A carrier may also be referred to as a component carrier (CC), a cell, a frequency channel, etc.

SUMMARY

Techniques for signaling carrier bandwidths supported by a UE for carrier aggregation are disclosed herein. The UE may be configured with a plurality of carriers for carrier aggregation. Each carrier may have one of a set of possible carrier bandwidths. The set of possible carrier bandwidths for each carrier may be dependent on a frequency band in which the carrier belongs. There may be many possible combinations of carrier bandwidths for the plurality of carriers.

In one aspect, the UE may signal or send at least one carrier bandwidth combination supported by the UE for the plurality of carriers configured for the UE. The supported carrier bandwidth combination(s) may include a subset of all possible carrier bandwidth combinations for the plurality of carriers. Signaling the supported carrier bandwidth combination(s) may simplify testing and operation of the UE.

In another aspect, the UE may identify the plurality of carriers configured for the UE for carrier aggregation. The UE may identify at least one carrier bandwidth combination supported by the UE for the plurality of carriers. Each carrier bandwidth combination may include a particular carrier bandwidth for each of the plurality of carriers. The UE may send signaling indicative of the at least one carrier bandwidth combination supported by the UE for the plurality of carriers. The UE may thereafter communicate on the plurality of carriers based on a carrier bandwidth combination selected from the at least one carrier bandwidth combination supported by the UE.

Various aspects and features of the disclosure are described in further detail below.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 includes IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA, E-UTRA, and GSM are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SC-FDMA on the uplink. UTRA, E-UTRA, GSM, UMTS, LTE and LTE-A are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
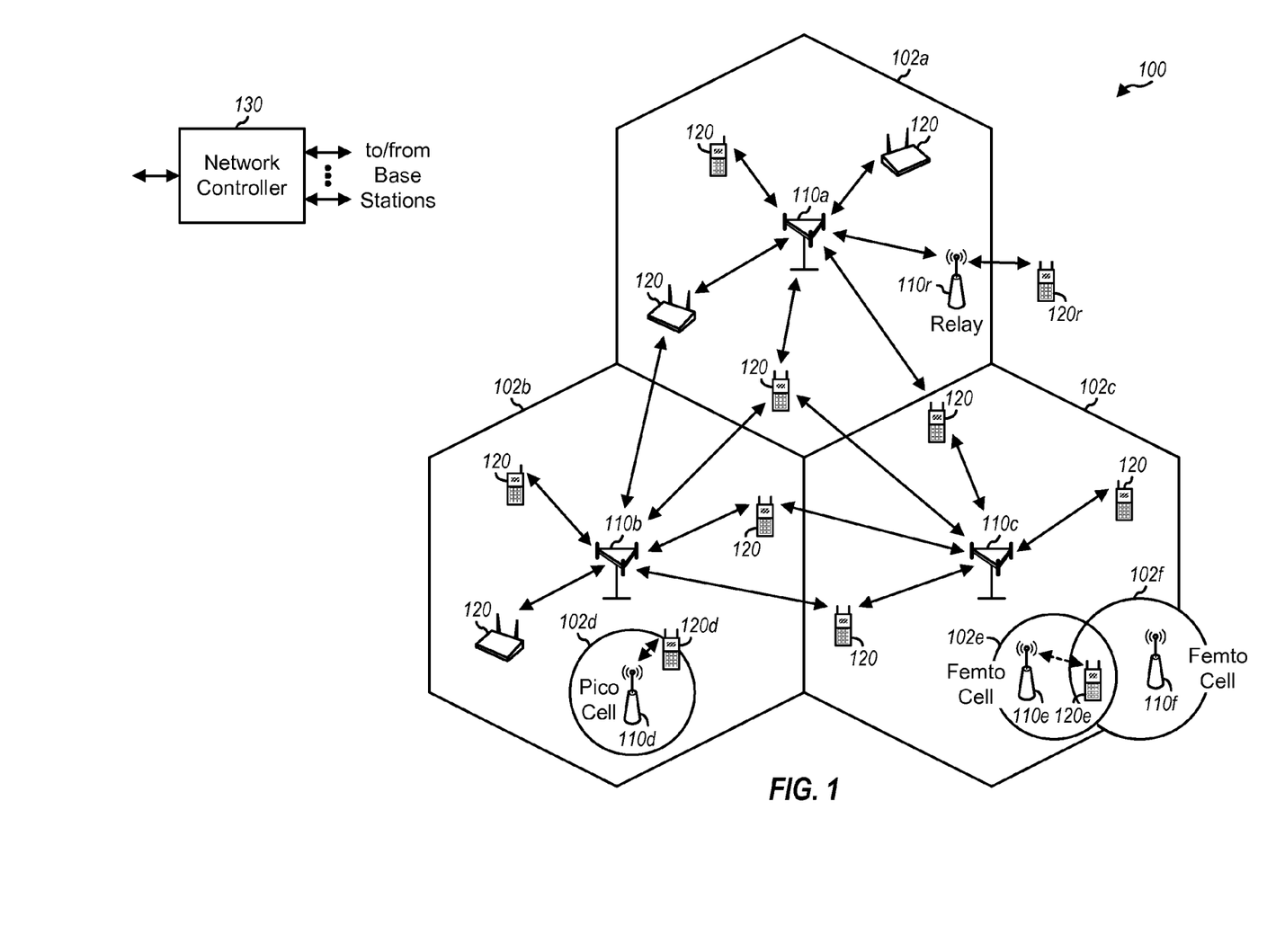
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be a station that communicates with the UEs and may also be referred to as a base station, a Node B, an access point, a node, etc. Each eNB 110 may provide communication coverage for a particular geographic area and may support communication for the UEs located within the coverage area. In 3GPP, the term "cell" can refer to a coverage area of an eNB and/or an eNB subsystem serving this coverage area, depending on the context in which the term is used. An eNB may support one or multiple (e.g., three) cells.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 110a, 110b and 110c may be macro eNBs for macro cells 102a, 102b and 102c, respectively. eNB 110d may be a pico eNB for a pico cell 102d. eNBs 110e and 110f may be femto eNBs for femto cells 102e and 102f, respectively.

Wireless network 100 may also include relays. In the example shown in FIG. 1, a relay 110r may communicate with eNB 110a and a UE 120r in order to facilitate communication between eNB 110a and UE 120r.

A network controller 130 may couple to a set of eNBs and provide coordination and control for these eNBs. Network controller 130 may communicate with the eNBs via a backhaul. The eNBs may also communicate with one another, e.g., directly or indirectly via wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a smartphone, a tablet, a personal digital assistant (PDA), a wireless modem, a wireless communication device, a handheld device, a laptop computer, a cordless phone, a wireless local loop (WLL) station, a netbook, a smartbook, etc. A UE may be able to communicate with macro eNBs, pico eNBs, femto eNBs, relays, etc.

Wireless network 100 may support operation on multiple carriers, which may be referred to as carrier aggregation (CA) or multi-carrier operation. A carrier may also be referred to as a component carrier (CC), a cell, a frequency channel, etc. The terms "carrier", "CC", and "cell" are used interchangeably herein. A carrier used for the downlink may be referred to as a downlink carrier, and a carrier used for the uplink may be referred to as an uplink carrier. A UE may be configured with multiple downlink carriers and one or more uplink carriers for carrier aggregation. An eNB may transmit data and/or control information on one or more downlink carriers to the UE. The UE may transmit data and/or control information on one or more uplink carriers to the eNB.

Figure 2:
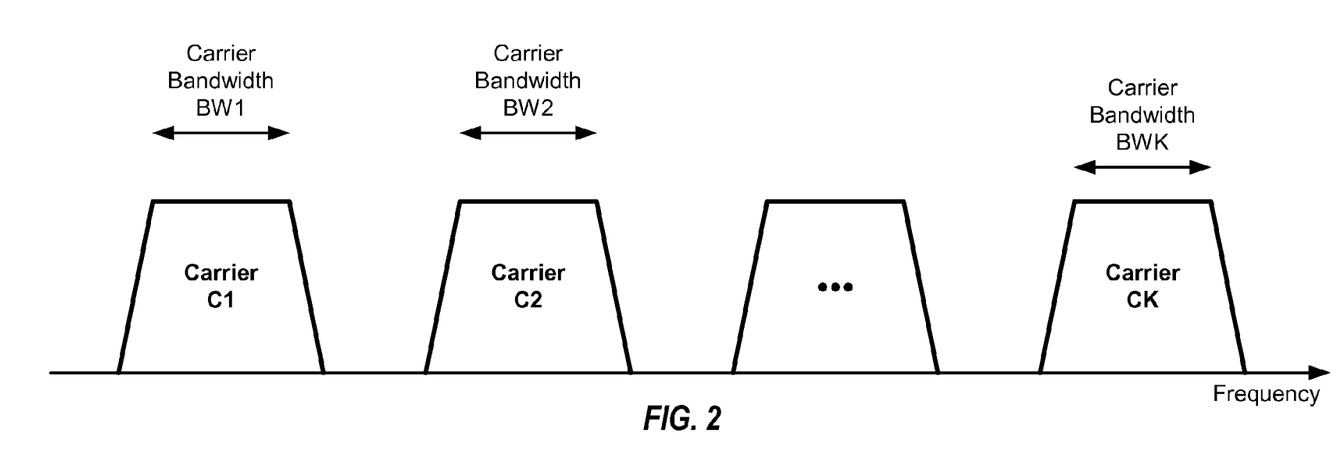
FIG. 2 shows an example of carrier aggregation.

FIG. 2 shows an example of carrier aggregation. In this example, K carriers may be configured for a UE and may be referred to as carriers C1, C2, . . . , CK, where K may be any integer value. The carriers may be adjacent to each other in frequency for contiguous carrier aggregation (not shown in FIG. 2). Alternatively, the carriers may be separated from each other in frequency for non-contiguous carrier aggregation, as shown in FIG. 2. In any case, each carrier may be associated with a particular carrier bandwidth (BW) and a particular center frequency. The K carriers have different center frequencies and may have the same or different carrier bandwidths.

Wireless network 100 may support wireless communication on one or more frequency bands. A frequency band may refer to a range of contiguous frequency spectrum and may also be referred to as a band. A list of bands on which a wireless network may operate in LTE is given in 3GPP TS 36.101, which is publicly available.

LTE supports six possible bandwidths of 1.4, 3, 5, 10, 15 and 20 megahertz (MHz) for a given carrier. Bandwidth of a carrier may also be referred to as carrier bandwidth or channel bandwidth. LTE also supports a set of carrier bandwidths for each band. The set of carrier bandwidths supported for each band may include some or all of the six possible carrier bandwidths.

Table 1 lists a set of bands supported by LTE Release 11 and described in 3GPP TS 36.101. Table 1 also lists a set of carrier bandwidths supported by LTE Release 11 for each band. It will be appreciated that this information is illustrative and that the present disclosure is not limited to particular bands or carrier bandwidths. Later releases of LTE may support additional bands and/or additional carrier bandwidths.

TABLE 1

LTE Supported Carrier Bandwidths

| E-UTRA Band | 1.4 MHz | 3 MHz | 5 MHz | 10 MHz | 15 MHz | 20 MHz |
|---|---|---|---|---|---|---|
| 1 | — | — | Yes | Yes | Yes | Yes |
| 2 | Yes | Yes | Yes | Yes | Yes | Yes |
| 3 | Yes | Yes | Yes | Yes | Yes | Yes |
| 4 | Yes | Yes | Yes | Yes | Yes | Yes |
| 5 | Yes | Yes | Yes | Yes | — | — |
| 6 | — | — | Yes | Yes | — | — |
| 7 | — | — | Yes | Yes | Yes | Yes |
| 8 | Yes | Yes | Yes | Yes | — | — |
| 9 | — | — | Yes | Yes | Yes | Yes |
| 10 | — | — | Yes | Yes | Yes | Yes |
| 11 | — | — | Yes | Yes | — | — |
| 12 | Yes | Yes | Yes | Yes | — | — |
| 13 | — | — | Yes | Yes | — | — |
| 14 | — | — | Yes | Yes | — | — |
| ... | | | | | | |
| 17 | — | — | Yes | Yes | — | — |
| 18 | — | — | Yes | Yes | Yes | — |
| 19 | — | — | Yes | Yes | Yes | — |
| 20 | — | — | Yes | Yes | Yes | Yes |
| 21 | — | — | Yes | Yes | Yes | — |
| 22 | — | — | Yes | Yes | Yes | Yes |
| 23 | Yes | Yes | Yes | Yes | — | — |
| 24 | — | — | Yes | Yes | — | — |
| 25 | Yes | Yes | Yes | Yes | Yes | Yes |
| 26 | Yes | Yes | Yes | Yes | Yes | — |
| . | . | . | . | . | . | . |
| . | . | . | . | . | . | . |
| . | . | . | . | . | . | . |
| 33 | — | — | Yes | Yes | Yes | Yes |
| 34 | — | — | Yes | Yes | Yes | — |
| 35 | Yes | Yes | Yes | Yes | Yes | Yes |
| 36 | Yes | Yes | Yes | Yes | Yes | Yes |
| 37 | — | — | Yes | Yes | Yes | Yes |
| 38 | — | — | Yes | Yes | Yes | Yes |
| 39 | — | — | Yes | Yes | Yes | Yes |
| 40 | — | — | Yes | Yes | Yes | Yes |
| 41 | — | — | Yes | Yes | Yes | Yes |
| 42 | — | — | Yes | Yes | Yes | Yes |
| 43 | — | — | Yes | Yes | Yes | Yes |

A UE may be configured for operation on multiple (K) carriers in one or more bands. The configured carriers may be referred to as a CA combination. The UE may support one or more carrier bandwidths for each carrier in the CA combination. Since up to 6 carrier bandwidths are possible for each carrier, there may be up to $6^K$ possible combinations of carrier bandwidths for the K carriers. For example, the UE may be configured for operation on two carriers in two bands for inter-band CA, and up to 36 combinations of carrier bandwidths may be possible for the two bands. These exemplary combinations of carrier bandwidths may include 1.4+1.4, 1.4+3, 1.4+5, 1.4+10, 1.4+15, 1.4+20, 3+1.4, 3+3, etc., where BW1+BW2 denotes a carrier bandwidth of BW1 for one carrier and a carrier bandwidth of BW2 for the other carrier.

A large number of combinations of carrier bandwidths (or carrier bandwidth combinations) may be possible for the K carriers configured for the UE. The number of possible carrier bandwidth combinations increases rapidly as progressively more carriers are supported by the UE. The large number of possible carrier bandwidth combinations for the K configured carriers may present an implementation and testing burden. For example, the UE may be designed to support operation on K carriers and may be tested to ensure that it can operate properly on each possible combination of carrier bandwidths for the K carriers. Extensive testing may then be required in order to ensure proper operation of the UE on all possible carrier bandwidth combinations for the K carriers.

Implementation and testing burdens may be undesirable especially when some carrier bandwidth combinations may be of little or no commercial interest, e.g., because of real-world deployment considerations. For example, the combination of the largest carrier bandwidths for the K carriers (e.g., the combination with 20 MHz carrier bandwidth for each carrier) may not offer the most commercial interest in the near future because wireless networks may be deployed with 10 MHz carrier bandwidth in an initial phase for a variety of reasons.

Of all possible carrier bandwidth combinations, only a subset may be of commercial interest and the subset may be dependent on the specific set of carriers (or CA combination) configured for the UE. For example, the UE may be configured with two carriers—one carrier in band A and another carrier in band B. Band A may support up to 20 MHz carrier bandwidth, and band B may support up to 10 MHz carrier bandwidth. In this example, the carrier bandwidth combinations of greatest commercial interest may include 5+10, 10+10, 10+5 MHz, etc.

Because a large number of carrier bandwidth combinations may be possible but only a subset of these carrier bandwidth combinations may be of commercial interest, CA features may be deployed and tested for only certain carrier bandwidth combinations in order to reduce implementation and test burden. However, deploying and testing only certain carrier bandwidth combinations may pose severe interference issues (e.g., interference-over-thermal (IoT) issues) at a later time if new carrier bandwidths are enabled.

In one aspect of the present disclosure, a UE may signal or send at least one carrier bandwidth combination supported by the UE for a plurality of carriers. The supported carrier bandwidth combination(s) may include all or a subset of the possible carrier bandwidth combinations for the plurality of carriers. Signaling the supported carrier bandwidth combination(s) may simplify testing and operation of the UE and may also provide other advantages.

The UE may signal the carrier bandwidth combination(s) supported by the UE in various manners. Some exemplary designs of signaling the supported carrier bandwidth combination(s) are described below.

In a first design, the UE may signal the specific carrier bandwidth combinations supported by the UE for K carriers, where K may be any integer value. For example, $N_1$ carrier bandwidths may be possible for carrier C1, $N_2$ carrier bandwidths may be possible for carrier C2, and so on, and $N_K$ carrier bandwidths may be possible for carrier CK. In this case, there would be $N_{total}$ possible permutations of carrier bandwidths for the K carriers, which may be expressed as:

$$N_{total} = \prod_{k=1}^{K} N_k, \quad \text{Eq (1)}$$

where $N_k$ is the number of possible carrier bandwidths for carrier k.

The UE may signal the specific carrier bandwidth combinations supported by the UE among the $N_{total}$ possible carrier bandwidth combinations for the K carriers. For example, the UE may support one carrier on band X and one carrier on band Y and may support four carrier bandwidth combinations of 5+5, 5+10, 10+5, and 10+10 MHz among 36 possible permutations of carrier bandwidths for the two carriers. The UE may then send signaling to indicate support of four carrier bandwidth combinations of 5+5, 5+10, 10+5, and 10+10 MHz.

In a second design, the available carrier bandwidth combinations for a set of carriers may be predefined. For example, a table may be defined to include all available carrier bandwidth combinations for K carriers, which may be all or a subset of the $$\prod_{k=1}^{K} N_k$$

possible permutations of carrier bandwidths for the K carriers. The UE may signal the specific carrier bandwidth combinations supported by the UE among the available carrier bandwidth combinations for the K carriers in the table.

In a third design, different available sets of carrier bandwidth combinations for K carriers may be predefined. Each set may include at least one carrier bandwidth combination for the K carriers. The available sets of carrier bandwidth combinations may correspond to different subsets of all possible carrier bandwidth combinations for the K carriers. The UE may signal at least one set of carrier bandwidth combination(s) supported by the UE among all available sets of carrier bandwidth combination(s) for the K carriers.

Various forms of signaling may be used to convey the carrier bandwidth combination(s) supported by the UE for the K carriers. Some exemplary designs of signaling to convey the supported carrier bandwidth combination(s) are described below.

Figure 3:
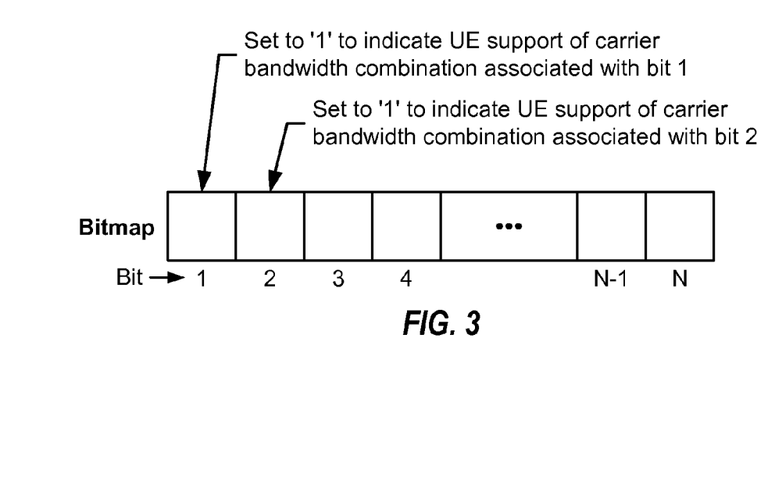
FIGS. 3 and 4 show signaling of supported carrier bandwidth combination(s) using a bitmap and indices, respectively.

FIG. 3 shows an exemplary design for signaling the carrier bandwidth combination(s) supported by the UE using a bitmap. In this design, a bitmap of N bits may be defined, where N may be any value. For example, N may be equal to $N_{total}$ given in equation (1) if all possible carrier bandwidth combinations are available. N may also be less than $N_{total}$, e.g., for the second and third designs described above.

Each bit of the bitmap may be associated with a specific carrier bandwidth combination. The UE may set the bit corresponding to each of its supported carrier bandwidth combinations. For example, the UE may support one carrier in band 1 and one carrier in band 2. From Table 1, four possible carrier bandwidths are supported for the carrier in band 1, and four possible carrier bandwidths are supported for the carrier in band 5. Hence, there are 16 possible carrier bandwidth combinations for one carrier in band 1 and one carrier in band 5. A bitmap with 16 bits may be defined for the 16 possible carrier bandwidth combinations. The UE may signal each carrier bandwidth combination supported by the UE for the two carriers by setting the corresponding bit in the bitmap for each supported carrier bandwidth combination.

Alternatively or additionally, each bit of the bitmap may be associated with a different set of at least one carrier bandwidth combination (instead of a different carrier bandwidth combination). A plurality of sets of at least one carrier bandwidth combination may be defined. The bitmap may then include a plurality of bits for the plurality of sets of carrier bandwidth combination(s), one bit for each set of carrier bandwidth combination(s). The UE may signal each set of carrier bandwidth combination(s) supported by the UE by setting the corresponding bit in the bitmap.

Figure 4:
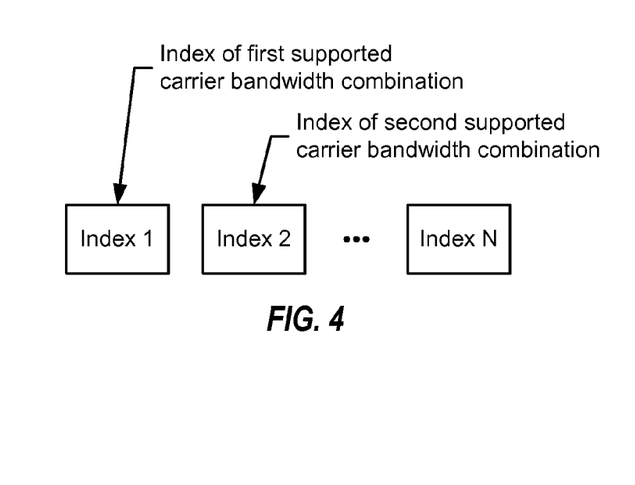

FIG. 4 shows a design of signaling the carrier bandwidth combination(s) supported by the UE using indices. In this design, each possible (or available) carrier bandwidth combination may be associated with a unique index. The UE may signal the index of each carrier bandwidth combination supported by the UE. In the example described above with one carrier in band 1 and one carrier in band 5, each of the 16 possible carrier bandwidth combinations for the two carriers may be assigned a different 4-bit index. The UE may then signal a 4-bit index of each carrier bandwidth combination supported by the UE.

In another design, each possible (or available) set of at least one carrier bandwidth combination may be associated with a unique index. The UE may then signal the index of each set of at least one carrier bandwidth combination supported by the UE.

In yet another design, the UE may signal the total bandwidth supported by the UE for the K carriers. The carrier bandwidth combinations supported by the UE may then include all carrier bandwidth combinations with an aggregate bandwidth that is less than or equal to the total bandwidth supported by the UE. For example, the UE may signal that it supports a total bandwidth of 20 MHz for two carriers. The carrier bandwidth combinations supported by the UE may then include 10+10, 15+5, 5+15, 10+5, 5+10, 5+5 MHz, etc.

In one design, a set of possible total bandwidths may be available. For example, the set may include 20 MHz, 25 MHz, 30 MHz, 40 MHz, etc. Each possible total bandwidth may be assigned a unique index. The UE may then send an index of the total bandwidth supported by the UE for the K carriers. The total bandwidth may also be conveyed in other manners.

In yet another design, the UE may signal the maximum bandwidth supported by the UE for each band or each carrier. The carrier bandwidth combinations supported by the UE may then include all carrier bandwidth combinations that meet the per-band or per-carrier bandwidth limit of the UE. For example, the UE may signal that it supports carrier bandwidth of 10 MHz for each of two carriers. The carrier bandwidth combinations supported by the UE may then include 10+10, 10+5, 5+10, 5+5, etc.

In yet another design, the UE may signal the carrier bandwidth combinations supported by the UE for the K carriers based on its UE category. A number of UE categories may be supported by the wireless network. Each UE category may be associated a different set of carrier bandwidth combinations for the K carriers. Progressively higher UE category may be associated with greater capability and hence more carrier bandwidth combinations.

The UE may support one or more CA band combinations. Each CA band combination may correspond to a different set of bands supported by the UE. The UE may support a set of carrier bandwidth combinations for each CA band combination supported by the UE. The supported carrier bandwidth combinations for each CA band combination may be dependent on the specific bands in the CA band combination. The UE may support different sets of carrier bandwidth combinations for different CA band combinations. The UE may send signaling to indicate the carrier bandwidth combinations supported by the UE for each CA band combination supported by the UE. The signaling for the supported carrier bandwidth combinations for each CA band combination may comprise any of the information described above, e.g., a bitmap, a set of indices of the supported carrier bandwidth combinations, a total bandwidth for all carriers, a maximum bandwidth for each CA band combination, band, and/or carrier, etc.

Signaling conveying the supported CA band combinations and/or the supported carrier bandwidth combinations may be sent via Radio Resource Control (RRC) or some other layer. The signaling may be sent during call setup phase, during RRC reconfiguration, and/or at other times.

Figure 5:
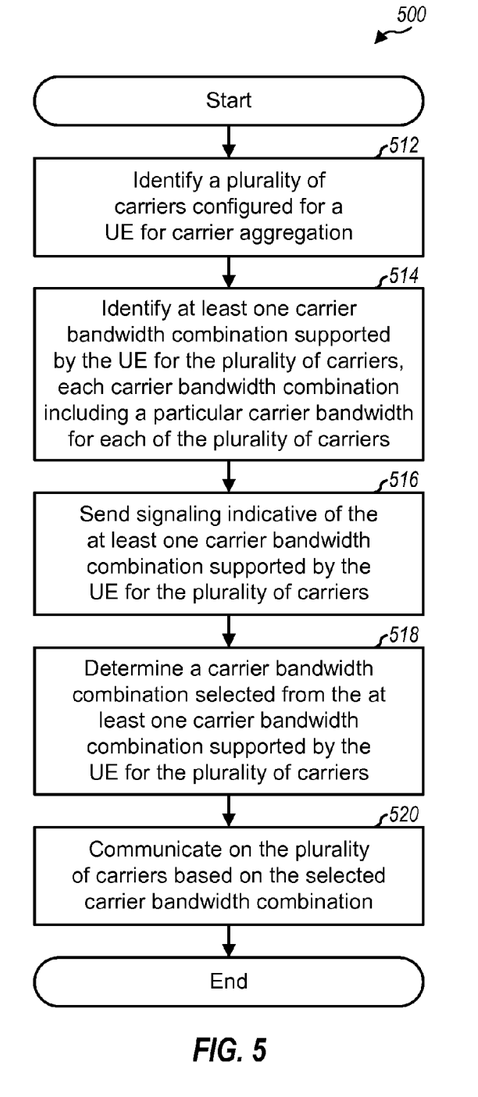
FIG. 5 shows a process for signaling at least one carrier bandwidth combination supported by a UE.

FIG. 5 shows an exemplary process 500 for signaling carrier bandwidth combinations according to the present disclosure. Process 500 may be performed by a UE (as described below) or by some other entity. The UE may identify a plurality of carriers configured for the UE for carrier aggregation (block 512). The UE may identify at least one carrier bandwidth combination supported by the UE for the plurality of carriers (block 514). Each carrier bandwidth combination may include a particular carrier bandwidth for each of the plurality of carriers. The UE may send signaling indicative of the at least one carrier bandwidth combination supported by the UE for the plurality of carriers (block 516). The UE may determine a carrier bandwidth combination selected from the at least one carrier bandwidth combination supported by the UE for the plurality of carriers (block 518). The UE may communicate on the plurality of carriers based on the selected carrier bandwidth combination (block 520).

In one aspect, the UE may send additional signaling indicative of at least one band supported by the UE. The plurality of carriers may be in the at least one band. Each band may be associated with a set of possible carrier bandwidths for a carrier in the band, e.g., as shown in Table 1. Alternatively, each of the plurality of carriers may be associated with a set of carrier bandwidths supported on the carrier.

In another aspect, a plurality of possible carrier bandwidth combinations may be determined based on a set of possible carrier bandwidths for each carrier configured for the UE, which may depend on the band in which the carrier belongs. The plurality of possible carrier bandwidth combinations may include all possible permutations of carrier bandwidths and may be determined as shown in equation (1). The at least one carrier bandwidth combination supported by the UE may be a subset of the plurality of possible carrier bandwidth combinations. The at least one carrier bandwidth combination supported by the UE may be a subset of a plurality of available carrier bandwidth combinations, which may be predefined for the at least one band or the plurality of carriers.

The signaling indicative of the at least one carrier bandwidth combination supported by the UE may covey various types of information. In one design, the signaling may comprise a bitmap of a plurality of bits for a plurality of available carrier bandwidth combinations for the plurality of carriers. Each bit of the bitmap may be associated with a different carrier bandwidth combination for the plurality of carriers. Alternatively, each bit of the bitmap may be associated with a different set of at least one carrier bandwidth combination for the plurality of carriers. Each bit of the bitmap may also be defined in other manners. Alternatively, the signaling may comprise an index of each carrier bandwidth combination or an index of each set of at least one carrier bandwidth combination supported by the UE. The signaling may indicate at least one of a plurality of sets of carrier bandwidth combinations, which may be predefined for the plurality of carriers. Each set of carrier bandwidth combinations may include at least one carrier bandwidth combination for the plurality of carriers.

In another aspect, the signaling may indicate a total bandwidth supported by the UE for the plurality of carriers. Each of the at least one carrier bandwidth combination may be associated with an aggregate bandwidth for the plurality of carriers of less than or equal to the total bandwidth. In yet another design, the signaling may indicate a maximum bandwidth supported by the UE for each of the plurality of carriers. Alternatively, the signaling may indicate a maximum bandwidth supported by the UE for each of the at least one band. In yet another design, the signaling may be conveyed by a UE category of the UE.

The plurality of carriers may be in at least two bands for inter-band CA and may be in a single band for intra-band CA. The plurality of carriers may also include at least two carriers in a first band and at least one additional carrier in a second band for a combination of inter-band CA and intra-band CA.

Figure 6:
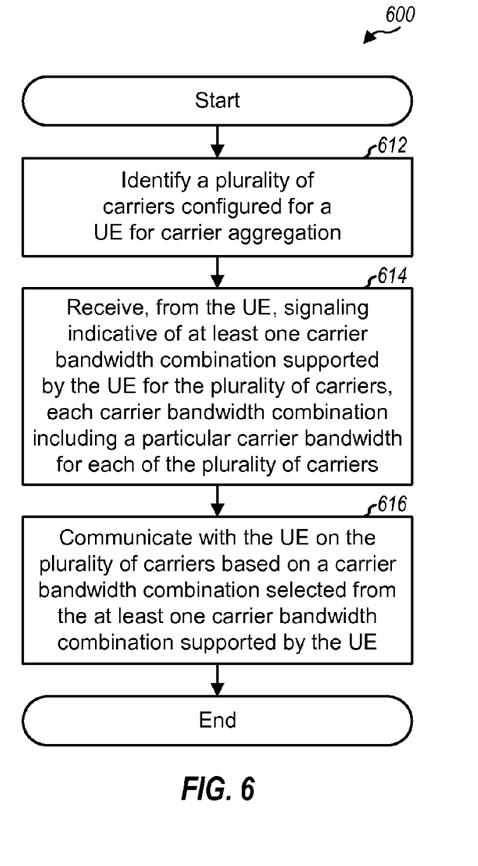
FIG. 6 shows a process for receiving signaling of at least one carrier bandwidth combination supported by a UE.

FIG. 6 shows an exemplary process 600 for receiving signaling of carrier bandwidth combinations according to the present disclosure. Process 600 may be performed by an eNB/base station (as described below) or by some other entity. The eNB may identify a plurality of carriers configured for a UE for carrier aggregation (block 612). The eNB may receive, from the UE, signaling indicative of at least one carrier bandwidth combination supported by the UE for the plurality of carriers (block 614). Each carrier bandwidth combination may include a particular carrier bandwidth for each of the plurality of carriers. The signaling may comprise a bitmap, an index of each carrier bandwidth combination supported by the UE, an index of each set of at least one carrier bandwidth combination supported by the UE, a set of carrier bandwidth combinations among a plurality of possible sets of carrier bandwidth combinations, etc. The eNB may also receive, from the UE, additional signaling indicative of at least one band supported by the UE. The eNB may communicate with the UE on the plurality of carriers based on a carrier bandwidth combination selected from the at least one carrier bandwidth combination supported by the UE (block 616).

Figure 7:
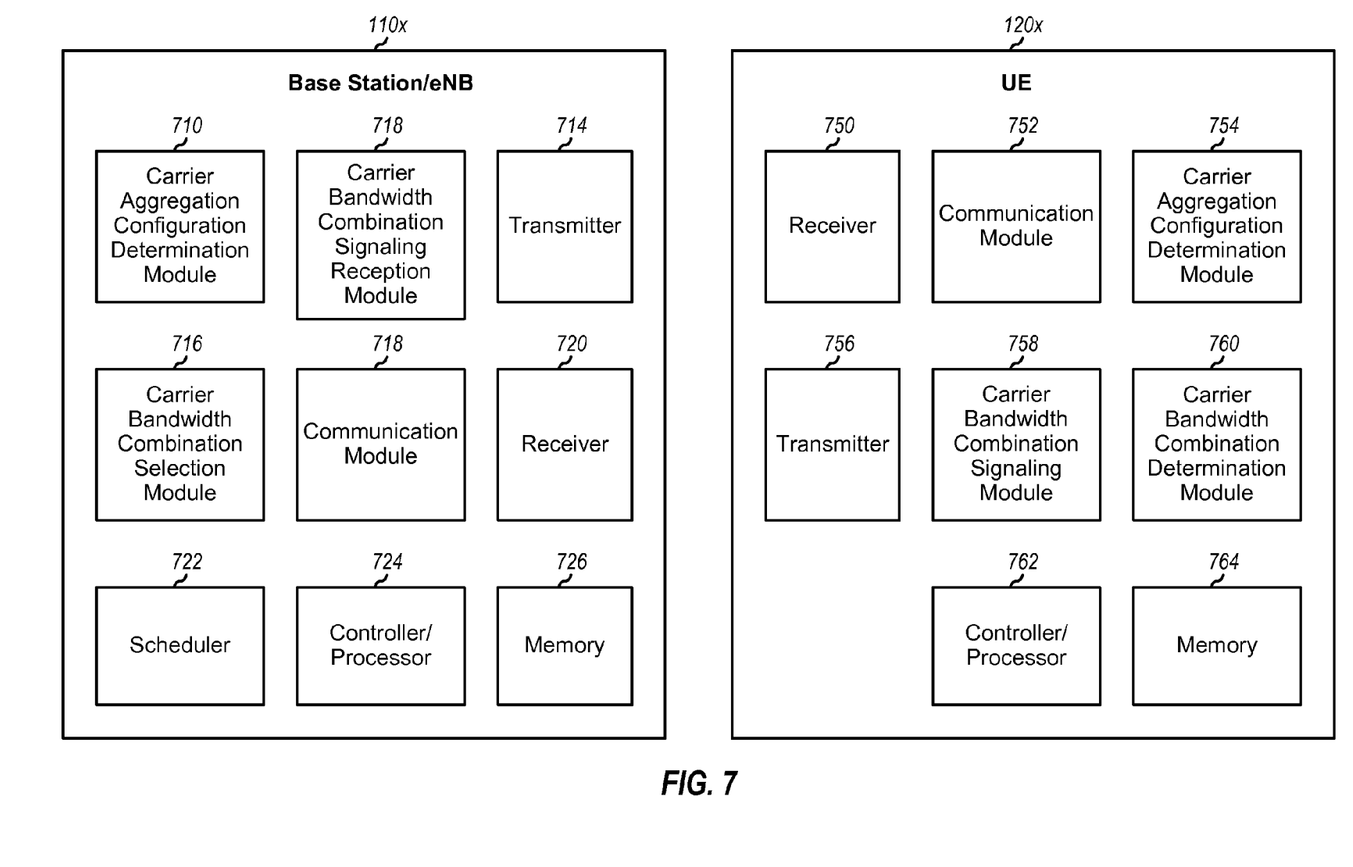
FIG. 7 is a block diagram showing a design of a base station and a UE in accordance with the present disclosure.

FIG. 7 shows a block diagram of a base station/eNB 110x and a UE 120x, which may be one of the base stations/eNBs and one of the UEs in FIG. 1. At base station 110x, a module 710 may determine a carrier aggregation configuration of UE 120x and may identify downlink carriers and uplink carriers configured for UE 120x. A module 712 may receive signaling indicative of at least one carrier bandwidth combination supported by UE 120x. A module 716 may select a particular carrier bandwidth combination to use for UE 120x from among the at least one carrier bandwidth combination supported by UE 120x. A module 718 may support communication on the carriers configured for UE 120x based on the carrier bandwidths selected for these carriers. Module 718 may process data for downlink transmission to UE 120x and other UEs and may also process uplink transmissions from UE 120x and other UEs. A transmitter 714 may generate and transmit one or more downlink signals comprising transmissions of data and control information. A receiver 720 may receive and process uplink signals transmitted by UE 120x and other UEs. The various modules within base station 110x may operate as described above. A controller/processor 724 may direct the operation of various modules within base station 110x. A memory 726 may store data and program codes for base station 110x. A scheduler 722 may schedule UEs for data transmission.

At UE 120x, a receiver 750 may receive and process downlink signals transmitted base station 110x and other base stations. A transmitter 756 may generate and transmit one or more uplink signals comprising transmissions of data and control information. A module 754 may determine a carrier aggregation configuration of UE 120x and may identify downlink carriers and uplink carriers configured for UE 120x. A module 760 may determine at least one carrier bandwidth combination supported by UE 120x for all carriers configured for UE 120x. A module 758 may send signaling indicative of the at least one carrier bandwidth combination supported by UE 120x. A module 752 may support communication on the carriers configured for UE 120x based on carrier bandwidths selected for these carriers. Module 752 may process downlink transmissions sent to UE 120x and may also process uplink transmissions sent by UE 120x. The various modules within UE 120x may operate as described above. A controller/processor 762 may direct the operation of various modules within UE 120x. A memory 764 may store data and program codes for UE 120x.

Figure 8:
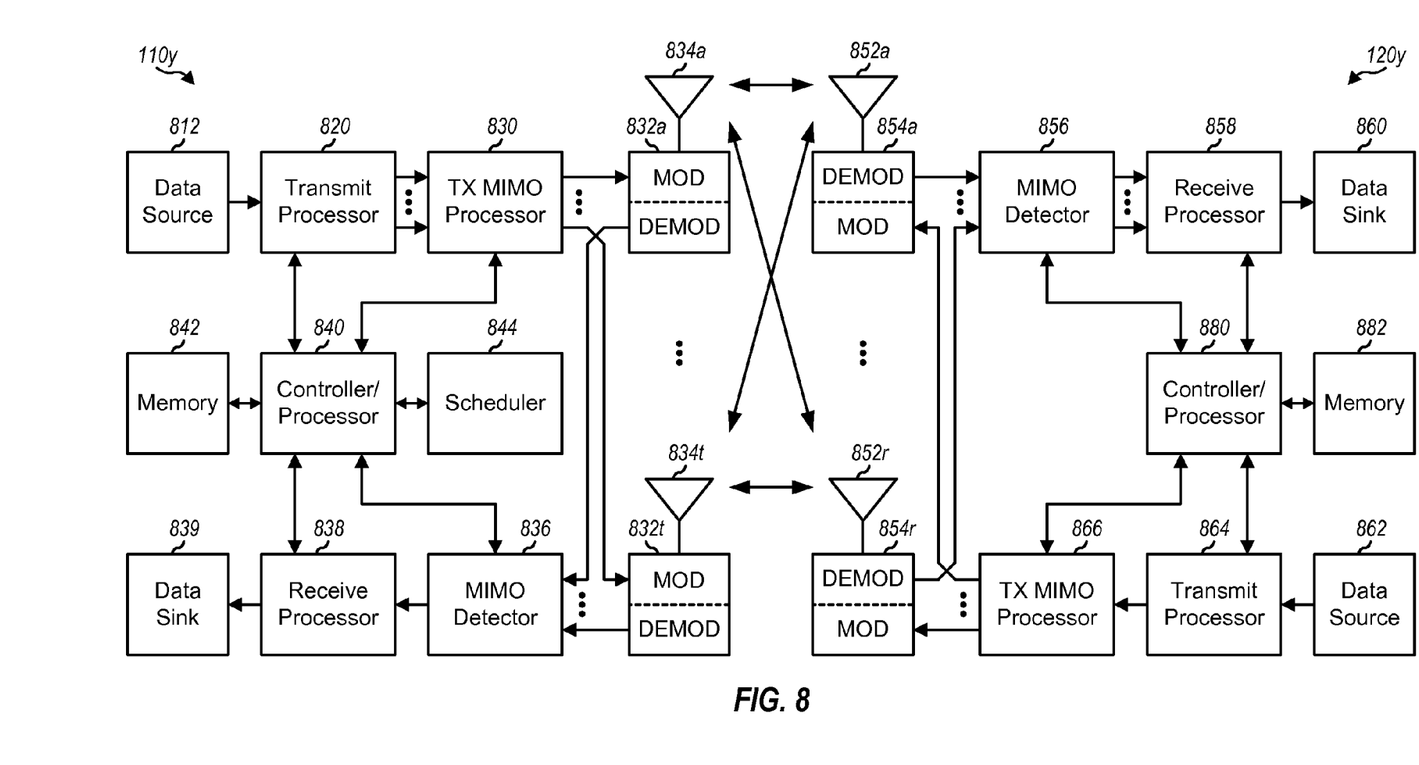
FIG. 8 is a block diagram showing another design of a base station and a UE in accordance with the present disclosure.

The modules in FIG. 7 may comprise processors, electronic devices, hardware devices, electronic components, logical circuits, memories, software codes, firmware, etc., or any combination thereof FIG. 8 shows a block diagram of a design of a base station/eNB 110y and a UE 120y, which may be one of the base stations/eNBs and one of the UEs in FIG. 1. Base station 110y may be equipped with T antennas 834a through 834t, and UE 120y may be equipped with R antennas 852a through 852r, where in general T≥1 and R≥1.

At base station 110y, a transmit processor 820 may receive data from a data source 812 for transmission on downlink carriers to one or more UEs, process (e.g., encode and modulate) the data for each UE based on one or more modulation and coding schemes selected for that UE, and provide data symbols for all UEs. Transmit processor 820 may also process control information (e.g., for grants, configuration messages, etc.) and provide control symbols. Processor 820 may also generate reference symbols for reference signals. A transmit (TX) multiple-input multiple-output (MIMO) processor 830 may precode the data symbols, the control symbols, and/or the reference symbols (if applicable) and may provide T output symbol streams to T modulators (MOD) 832a through 832t. Each modulator 832 may process its output symbol stream (e.g., for OFDM, etc.) to obtain an output sample stream. Each modulator 832 may further condition (e.g., convert to analog, amplify, filter, and upconvert) its output sample stream to obtain a downlink signal. T downlink signals from modulators 832a through 832t may be transmitted via T antennas 834a through 834t, respectively.

At UE 120y, antennas 852a through 852r may receive the downlink signals from base station 110y and/or other base stations and may provide received signals to demodulators (DEMODs) 854a through 854r, respectively. Each demodulator 854 may condition (e.g., filter, amplify, downconvert, and digitize) its received signal to obtain input samples. Each demodulator 854 may further process the input samples (e.g., for OFDM, etc.) to obtain received symbols. A MIMO detector 856 may obtain received symbols from all R demodulators 854a through 854r, perform MIMO detection on the received symbols, and provide detected symbols. A receive processor 858 may process (e.g., demodulate and decode) the detected symbols, provide decoded data for UE 120y to a data sink 860, and provide decoded control information to a controller/processor 880.

On the uplink, at UE 120y, a transmit processor 864 may receive and process data from a data source 862 and control information from controller/processor 880. The control information may comprise signaling indicating at least one channel bandwidth combination supported by UE 120y for K carriers configured for UE 120y. The control information may also comprise signaling indicating at least one band supported by UE 120y. Processor 864 may also generate reference symbols for one or more reference signals. The symbols from transmit processor 864 may be precoded by a TX MIMO processor 866 if applicable, further processed by modulators 854a through 854r (e.g., for SC-FDM, OFDM, etc.), and transmitted to base station 110y. At base station 110y, the uplink signals from UE 120y and other UEs may be received by antennas 834, processed by demodulators 832, detected by a MIMO detector 836 if applicable, and further processed by a receive processor 838 to obtain decoded data and control information sent by UE 120y and other UEs. Processor 838 may provide the decoded data to a data sink 839 and the decoded control information to controller/processor 840.

Controllers/processors 840 and 880 may direct the operation at base station 110y and UE 120y, respectively. Processor 840 and/or other processors and modules at base station 110y may perform or direct process 600 in FIG. 6 and/or other processes for the techniques described herein. Processor 880 and/or other processors and modules at UE 120y may perform or direct process 500 in FIG. 5 and/or other processes for the techniques described herein. Memories 842 and 882 may store data and program codes for base station 110y and UE 120y, respectively. A scheduler 844 may schedule UEs for data transmission on the downlink and/or uplink.

As described herein, information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Also, the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable storage medium may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Computer-readable media may also include connections. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   identifying a band combination, wherein the identified band combination comprises:
   a plurality of bands available for carrier aggregation at a user equipment (UE), wherein a set of possible carrier bandwidth combinations for the plurality of bands comprises combinations of available carrier bandwidths for each band of the plurality of bands, and a plurality of carrier bandwidth combination sets, wherein each carrier bandwidth combination set is associated with a respective subset of the set of possible carrier bandwidth combinations;

identifying a carrier bandwidth combination set that is supported by the UE from the plurality of carrier bandwidth combination sets;

sending signaling indicative of the identified carrier bandwidth combination set, the signaling comprising a bitmap having a plurality of bits, each bit of the bitmap being associated with a different one of the plurality of carrier bandwidth combination sets; and communicating with a base station on the plurality of bands using a carrier bandwidth combination selected from the identified carrier bandwidth combination set indicated by the UE.

2. The method of claim 1, wherein the set of possible carrier bandwidth combinations is predefined for the identified band combination.

3. The method of claim 2, wherein a subset of the set of possible carrier bandwidth combinations is predefined for the identified carrier bandwidth combination set.

4. The method of claim 1, wherein the signaling indicates a total bandwidth associated with the identified carrier bandwidth combination set.

5. The method of claim 4, wherein an aggregate bandwidth of one or more supported bandwidths associated with the identified carrier bandwidth combination set is less than or equal to the total bandwidth.

6. The method of claim 1, wherein the signaling indicates a maximum bandwidth supported by the UE for each of the plurality of carrier bandwidth combination sets.

7. The method of claim 1, wherein the signaling comprises a UE category of the UE.

8. The method of claim 1, wherein the band combination comprises at least two bands for inter-band carrier aggregation.

9. The method of claim 1, further comprising:
selecting the carrier bandwidth combination from a subset of the set of possible carrier bandwidth combinations associated wit the identified carrier bandwidth combination set indicated by the UE.

10. An apparatus for wireless communication, comprising:
at least one processor configured to:
  identify a band combination, wherein the identified band combination comprises:
  plurality of bands available for carrier aggregation at a user equipment (UE), wherein a set of possible carrier bandwidth combinations for the plurality of bands comprises combinations of available carrier bandwidths for each band of the plurality of bands, and
  a plurality of carrier bandwidth sets, wherein each carrier bandwidth combination set is associated with a respective subset of the set of possible carrier bandwidth combinations;
  identify a carrier bandwidth combination set that is supported by the UE from the plurality of carrier bandwidth combination sets;
  send signaling indicative of the identified carrier bandwidth combination set, the signaling comprising a bitmap having a plurality of bits, each bit of the bitmap being associated with a different one of the plurality of carrier bandwidth combination sets; and
  communicate with a base station on the plurality of bands using a carrier bandwidth combination selected from the identified carrier bandwidth combination set indicated by the UE; and
a memory coupled to the at least one processor.

11. The apparatus of claim 10, wherein the at least one processor is configured to:
select the carrier bandwidth combination from a subset of the set of possible carrier bandwidth combinations associated with the identified carrier bandwidth combination set indicated by the UE.

12. An apparatus for wireless communication, comprising:
means for identifying a band combination, wherein the identified band combination comprises:
a plurality of bands available for carrier aggregation at a user equipment (UE), wherein a set of possible carrier bandwidth combinations for the plurality of bands comprises combinations of available carrier bandwidths for each band of the plurality of bands, and
a plurality of carrier bandwidth combination sets, wherein each carrier bandwidth combination set is associated with a respective subset of the set of possible carrier bandwidth combinations;
means for identifying a carrier bandwidth combination set that is supported by the UE for the plurality of carrier bandwidth combination set;
means for sending signaling indicative of the identified carrier bandwidth combination set, the signaling comprising a bitmap having a plurality of bits, each bit of the bitmap being associated with a different one of the plurality of carrier bandwidth combination sets; and
means for communication with a base station on the plurality of bands using a carrier bandwidth combination selected from the identified carrier bandwidth combination set indicated by the UE.

13. The apparatus of claim 12, further comprising:
means for selecting the carrier bandwidth combination from a subset of the set of possible carrier bandwidth combinations associated with the identified carrier bandwidth combination set indicated by the UE.

14. A computer program product, comprising:
a non-transitory computer-readable medium comprising:
  code for causing at least one processor to identify a band combination, wherein the identified band combination comprises:
  a plurality of bands available for carrier aggregation at a user equipment (UE), wherein a set of possible carrier bandwidth combinations for the plurality of bands comprises combinations of available carrier bandwidths for each band of the plurality of bands, and
  a plurality of carrier bandwidth combination sets, wherein each carrier bandwidth combination set is associated with a respective subset of the set of possible carrier bandwidth combinations;
  code for causing the at least one processor to identify a carrier bandwidth combination that is supported by the UE from the plurality of carrier bandwidth combination sets;
  code for causing the at least one processor to send signaling indicative of the identified carrier bandwidth combination set, the signaling comprising a bitmap having a plurality of bits, each bit of the bitmap being associated with a different one of the plurality of carrier bandwidth combination sets; and
  code for causing the at least one processor to communicate with a base station on the plurality of bands using a carrier bandwidth combination selected from the identified carrier bandwidth combination set indicated by the UE.

15. A method for wireless communication, comprising:
identifying a band combination, wherein the identified band combination comprises:
a plurality of bands available for carrier aggregation at a user equipment (UE), wherein a set of possible carrier bandwidth combinations for the plurality of bands comprises combinations of available carrier bandwidths for each band of the plurality of bands, and
a plurality of carrier bandwidth combination sets, wherein each carrier bandwidth combination set is associated with a respective subset of the set of possible carrier bandwidth combinations;
receiving, from the UE, signaling indicative of a carrier bandwidth combination set that is supported by the UE for the plurality of carrier bandwidth combination sets, the signaling comprising a bitmap having a plurality of bits, each bit of the bitmap being associated with a different one of the plurality of carrier bandwidth combination sets; and
communicating with the UE on the plurality of bands using a carrier bandwidth combination selected from the carrier bandwidth combination set indicated by the UE.

16. The method of claim 15, wherein a subset of the set of possible carrier bandwidth combination is predefined for the carrier bandwidth combination set that is supported by the UE.

17. The method of claim 15, wherein the signaling indicates a total bandwidth associated with the carrier bandwidth combination set that is supported by the UE.

18. The method of claim 15, wherein the signaling indicates an aggregate bandwidth supported by the UE for the carrier bandwidth combination set that is supported by the UE that is less than or equal to a total bandwidth.

19. An apparatus for wireless communication, comprising:
at least one processor configured to:
identify a band combination, wherein the identified band combination comprises: a plurality of bands available for carrier aggregation at a user equipment (UE), wherein a set of possible carrier bandwidth combinations for the plurality of bands comprises combinations of available carrier bandwidths for each band of the plurality of bands, and
a plurality of carrier bandwidth combination sets, wherein each carrier bandwidth combination set is associated with a respective subset of the set of possible carrier bandwidth combinations;
receive, from the UE, signaling indicative of a carrier bandwidth combination set that is supported by the UE from the plurality of carrier bandwidth combination sets, the signaling comprising a bitmap having a plurality of bits, each bit of the bitmap being associated with a different one of the plurality of carrier bandwidth combination sets; and
communicate with the UE on the plurality of bands using a carrier bandwidth combination selected from the carrier bandwidth combination set indicated by the UE; and
a memory coupled to the at least one processor.

20. An apparatus for wireless communication, comprising:
means for identifying a band combination, wherein the identified band combination comprises:
a plurality of bands available for carrier aggregation at a user equipment (UE), wherein a set of possible carrier bandwidth combinations for the plurality of bands comprises combinations of available carrier bandwidths for each band of the plurality of bands, and
a plurality of carrier bandwidth combination sets, wherein each carrier bandwidth combination set is associated with a respective subset of the set of possible carrier bandwidth combinations;
means for receiving, from the UE, signaling indicative of a carrier bandwidth combination set that is supported by the UE from the plurality of carrier bandwidth combination sets, the signaling comprising a bitmap having a plurality of bits, each bit of the bitmap being associated with a different one of the plurality of carrier bandwidth combination sets; and
means for communicating with the UE on the plurality of bands using a carrier bandwidth combination selected from the carrier bandwidth combination set indicated by the UE.

21. A computer program product, comprising:
a non-transitory computer-readable medium comprising:
code for causing at least one processor to identify a band combination, wherein the identified band combination comprises:
a plurality of bands available for carrier aggregation at a user equipment (UE), wherein a set of possible carrier bandwidth combinations for the plurality of bands comprises combinations of available carrier bandwidths for each band of the plurality of bands, and
a plurality of carrier bandwidth combination sets, wherein each carrier bandwidth combination set is associated with a respective subset of the set of possible carrier bandwidth combinations;
code for causing the at least one processor to receive, from the UE, signaling indicative of a carrier bandwidth combination set that is supported by the UE from the plurality of carrier bandwidth combination sets, the signaling comprising a bitmap having a plurality of bits, each bit of the bitmap being associated with a different one of the plurality of carrier bandwidth combination sets; and
code for causing the at least one processor to communicate with the UE on the plurality of bands using a carrier bandwidth combination selected from the carrier bandwidth combination set indicated by the UE.

* * * * *